United States Patent
Hsin et al.

(10) Patent No.: US 6,560,059 B1
(45) Date of Patent: May 6, 2003

(54) METHOD AND APPARATUS FOR SUPPRESSING SEEK-INDUCED VIBRATION IN A DISC DRIVE

(75) Inventors: Yi-Ping Hsin, Burnsville, MN (US); John C. Morris, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/544,653

(22) Filed: Apr. 5, 2000

Related U.S. Application Data
(60) Provisional application No. 60/132,994, filed on May 7, 1999.

(51) Int. Cl.[7] .............................................. G11B 5/596
(52) U.S. Cl. ................................ 360/78.04; 360/77.04
(58) Field of Search ........................... 360/78.04, 78.09, 360/78.06, 77.07, 265.6, 77.04; 318/561; 700/63

(56) References Cited

U.S. PATENT DOCUMENTS

| | | | |
|---|---|---|---|
| 4,172,267 A | 10/1979 | Sidman | 360/78 |
| 4,337,427 A | 6/1982 | Maudal | 318/615 |
| 4,380,034 A | 4/1983 | Krake | 360/77 |
| 4,475,217 A | 10/1984 | Hughes | 375/81 |
| 4,477,755 A | 10/1984 | Rickert | 318/611 |
| 4,575,776 A | 3/1986 | Stephens et al. | 360/78 |
| 4,577,244 A | 3/1986 | El-Sadi | 360/77 |
| 4,581,664 A | 4/1986 | Sordello et al. | 360/78 |
| 4,614,986 A | 9/1986 | LaBudde | 360/78 |

(List continued on next page.)

OTHER PUBLICATIONS

"Minimum Power and Minimum Jerk Position Control and its Applications in Computer Disc Drives" by Denny K. Miu et al., for *IEEE Transactions of Magnetis*, vol. 27, No. 6, Nov. 1991 pp. 4469–4475.

(List continued on next page.)

*Primary Examiner*—David Hudspeth
*Assistant Examiner*—Fred F. Tzeng
(74) *Attorney, Agent, or Firm*—Westman, Champlin & Kelly, P.A.

(57) ABSTRACT

Apparatus suppresses seek-induced vibration in a disc drive. The apparatus is responsive to a selected bang-bang command to provide an operating signal to the actuator, such as a voice coil motor, representing the selected bang-bang command with damped amplitudes of dominant vibration mode frequencies of the selected bang-bang command. One example of the apparatus is a finite impulse response filter having a discrete transfer function of $C(1+a_{I1}z^{-1}+a_{I2}z^{-l \cdot 2}+ \ldots +a_{Ir}z^{-l \cdot r})$, where C is a constant, $a_{I1}, a_{I2}, \ldots a_{Ir}$ represent impulse amplitudes at spaced positions within a sample period and $z^{-l \cdot 1}, z^{-l \cdot 2}, \ldots z^{-l \cdot r}$ represent delay components at the respective spaced positions. In a preferred embodiment, the finite impulse response filter employs a pole-zero cancellation technique to damp amplitudes of selected frequencies. The discrete transfer function is derived based on a conjugate pair of poles in an s-domain for each of a plurality of vibration frequencies of $$s_i = -\zeta_i \omega_{ni} + j\omega_{ni}\sqrt{1-\zeta_i^2} \text{ and}$$

$$s_i^* = -\zeta_i \omega_{ni} - j\omega_{ni}\sqrt{1-\zeta_i^2}$$

where $\zeta_i$ is the damping ratio and $\omega_{ni}$ is the natural frequency for the i-th mode.

18 Claims, 6 Drawing Sheets

U.S. PATENT DOCUMENTS

| | | | | |
|---|---|---|---|---|
| 4,636,700 | A | | 1/1987 | Moore et al. ............... 318/611 |
| 4,642,541 | A | | 2/1987 | El-Sadi ....................... 318/616 |
| 4,675,761 | A | | 6/1987 | Ashbee et al. ................ 360/78 |
| 4,677,507 | A | | 6/1987 | Elliott .......................... 360/78 |
| 4,751,381 | A | | 6/1988 | Dorman ...................... 250/227 |
| 4,812,929 | A | * | 3/1989 | Stewart et al. ........... 360/77.07 |
| 4,885,516 | A | | 12/1989 | El-Sadi ....................... 318/615 |
| 5,065,386 | A | | 11/1991 | Takeya et al. ........... 369/44.32 |
| 5,115,421 | A | | 5/1992 | Rokutan .................. 369/44.33 |
| 5,257,251 | A | | 10/1993 | Chow et al. ............. 369/44.25 |
| 5,291,110 | A | | 3/1994 | Andrews, Jr. et al. ...... 318/560 |
| 5,309,299 | A | | 5/1994 | Crossland et al. ....... 360/77.01 |
| 5,343,131 | A | * | 8/1994 | Baumann .................... 318/561 |
| 5,444,346 | A | | 8/1995 | Sudo et al. ................. 318/616 |
| 5,453,888 | A | | 9/1995 | Tsunoda et al. .......... 360/77.08 |
| 5,465,034 | A | | 11/1995 | Andrews, Jr. et al. ...... 318/560 |
| 5,465,183 | A | | 11/1995 | Hattori ....................... 360/78.9 |
| 5,488,278 | A | | 1/1996 | McGraw et al. ............ 318/626 |
| 5,491,598 | A | * | 2/1996 | Stricklin et al. ......... 360/265.6 |
| 5,510,939 | A | | 4/1996 | Lewis ...................... 360/78.09 |
| 5,570,398 | A | | 10/1996 | Smith ......................... 375/376 |
| 5,653,317 | A | * | 8/1997 | Wakui ........................ 188/378 |
| 5,657,179 | A | * | 8/1997 | McKenzie ............... 360/78.06 |
| 5,661,615 | A | | 8/1997 | Waugh et al. ................ 360/75 |
| 5,677,609 | A | * | 10/1997 | Khan et al. ................. 318/561 |
| 5,726,818 | A | | 3/1998 | Reed et al. .................... 360/51 |
| 5,726,825 | A | | 3/1998 | Phan et al. .............. 360/78.07 |
| 5,812,336 | A | | 9/1998 | Spurbeck et al. ............. 360/51 |
| 5,825,582 | A | * | 10/1998 | Supino et al. ........... 360/78.06 |
| 5,893,048 | A | | 4/1999 | Pate et al. .................... 702/56 |
| 5,901,009 | A | | 5/1999 | Sri-Jayantha et al. .... 360/78.07 |
| 5,912,541 | A | | 6/1999 | Bigler et al. ................ 318/600 |
| 6,148,240 | A | * | 11/2000 | Wang et al. ................... 700/63 |
| 6,169,641 | B1 | * | 1/2001 | Hayner .................... 360/78.09 |
| 6,246,536 | B1 | * | 6/2001 | Galloway ................ 360/78.04 |
| 6,256,163 | B1 | * | 7/2001 | Schmidt et al. .......... 360/78.09 |

OTHER PUBLICATIONS

"A Zero–placement Technique for Designing Shaped Inputs to Suppress Multiple–mode Vibration" by Timothy D. Tuttle et al., for 1994 American Control Conference, Jun. 29–Jul. 1, 1993, vol. 3, pp. 2533–2537.

* cited by examiner

METHOD AND APPARATUS FOR SUPPRESSING SEEK-INDUCED VIBRATION IN A DISC DRIVE

CROSS-REFERENCE TO RELATED APPLICATION

This application claims benefit of Provisional Application No. 60/132,994, filed May 7, 1999, for "VIBRATION-SUPPRESSION TRACK SEEKING STRATEGY FOR DISC DRIVE HEAD USING INPUT COMMANDING FILTERING TECHNIQUE", by Yi-Ping Hsin and John C. Morris.

FIELD OF THE INVENTION

This invention relates to suppression of vibration during seek operations in a disc drive, and particularly to a filter for filtering bang-bang signals representing command profiles to suppress vibration modes.

BACKGROUND OF THE INVENTION

Disc drives employ discs having concentric data tracks and a head movable radially across the disc. The head is mounted on an actuator arm that is moved by an actuator, such as a voice coil motor, driven by a command signal. The command signal is selected by a non-linear look-up table containing representations of position velocity profiles to provide signals to the actuator. Ideally, the signal to the actuator is a full on, full off signal known in the trade as a bang-bang signal. The bang-bang signal operates the actuator to accelerate the movement of the actuator arm radially across the disc, followed by a deceleration cycle to bring the head to the desired track. For long seeks, a period of zero acceleration (constant velocity) may appear between the acceleration and deceleration cycles. Track counting is employed to count tracks during the seek operation to enable the controller to control the acceleration and deceleration cycles to bring the head to the destination track in the shortest amount of time. One problem with the seek operation is that mechanical resonance of the disc drive, including in the actuator arm itself, generates vibration, and therefore noise, during the seek operation. Additionally, mechanical impulses, applied to the actuator arm, also generate vibration and acoustic noise. Vibration is a particularly troublesome problem in seek systems employing bang-bang signals due to impulses created by sudden changes in acceleration in the arm movement. Vibration in the actuator arm and disc drive adversely affects the ability of the actuator arm to center the head on the desired track on the disc, thereby increasing the access time to the desired track. Noisy seeking requires additional time for damping out residual vibration.

Previously, several techniques had been employed to overcome the difficulties associated with vibration generated during track seeks. One technique is to simply permit the vibration to dampen, but this technique necessarily adds to the seek time.

Another technique employs an electrical model of the mechanical system. The drive signal operates the model to produce a series of signals representative of vibration of the system. These signals are monitored for peaks exceeding a predetermined threshold, in which case the servo is operated to delay the command to permit the vibration to dampen. An example of this system is found in Rickert, U.S. Pat. No. 4,477,755.

Another technique is to add a signal to the bang-bang signal to create a sinusoidal profile to the acceleration profile generated by the bang-bang signal. The added signal is representative of the mechanical noise and vibration of the disc drive. The generated acceleration profile represents a reasonably smooth motion of the actuator arm from the start track to the destination track. Examples of adding correction signals may be found in Andrews, U.S. Pat. No. 5,291,110, and in Miu, "Minimum Power and Minimum Jerk Position Controls and its Application in Computer Disk Drives", *IEEE Transactions on Magnetics*, Vol. 27, No. 6, Pages 4471–4475 (November 1991). While the approach of adding correction signals does not introduce objectionable delay to seek operations, these techniques act to cancel the effects of natural resonance or vibration of the system, rather than eliminate the vibration altogether.

SUMMARY OF THE INVENTION

In one form of the invention, a controller provides a series of bang-bang commands to operate the voice coil motor, or actuator, for an actuator arm of a disc drive containing at least one disc. A filter is responsive to selected ones of the bang-bang commands to provide an operating signal to the actuator representing the selected bang-bang command with damped amplitudes of dominant vibration mode frequencies of the selected bang-bang command.

A preferred form of the apparatus includes a finite impulse response filter having a discrete transfer function of $C(1+a_{l1}z^{-l}+a_{l2}z^{-l\cdot 2}+\ldots+a_{lr}z^{-l\cdot r})$, where C is a constant, $a_{l1}$, $a_{l2}$, ... $a_{lr}$ air represent impulse amplitudes at spaced positions within a sample period and $z^{-l\cdot 1}$, $z^{-l\cdot 2}$, ... $z^{-l\cdot r}$ represent delay components at the respective spaced positions.

In another preferred form of the apparatus the finite impulse response filter has a discrete sampling period, T, that is an integer multiple, l, of the controller sampling period, $t_s$, with l being as small as practical to maintain an all-positive amplitude solution for the filter with a short time duration. One example for integer l is 2.

Optionally, the apparatus includes a second filter, such as a low pass or band pass filter, for removing representations of frequencies in the selected bang-bang command above a designated frequency.

In another form of the invention, a method is provided for suppressing seek-induced vibration in a disc drive during seek operation. The method comprises providing a finite impulse response filter having a discrete transfer function of $C(1+a_{l1}z^{-l}+a_{l2}z^{-l\cdot 2}+\ldots+a_{lr}z^{-l\cdot r})$, where C is a constant, $a_{l1}$, $a_{l2}$, ... $a_{lr}$ represent impulse amplitudes at spaced positions within a sample period and $z^{-l\cdot 1}$, $z^{-l\cdot 2}$, ... $z^{-l\cdot r}$ represent delay components at the respective spaced positions. A bang-bang command for performing the seek operation is filtered using the finite impulse response filter to derive an operating signal, and the head is positioned based on the operating signal.

In a preferred form of the method, the finite impulse response filter damps amplitudes of selected frequencies by pole-zero cancellation. The discrete transfer function is derived based on a conjugate pair of poles in the s-domain for each of a plurality of vibration frequencies of $$s_i = -\zeta_i \omega_{ni} + j\omega_{ni}\sqrt{1-\zeta_i^2} \quad \text{and}$$

$$s_i^* = -\zeta_i \omega_{ni} - j\omega_{ni}\sqrt{1-\zeta_i^2}$$

where $\zeta_i$ is the damping ratio and $\omega_{ni}$ is the natural frequency for the i-th mode.

Optionally, the method also comprises removing frequencies in the selected bang-bang command above a designated frequency.

These and various other features as well as advantages which characterize the present invention will be apparent upon review of the following detailed description and the associated drawings.

DETAILED DESCRIPTION OF ILLUSTRATIVE EMBODIMENTS

Figure 1:
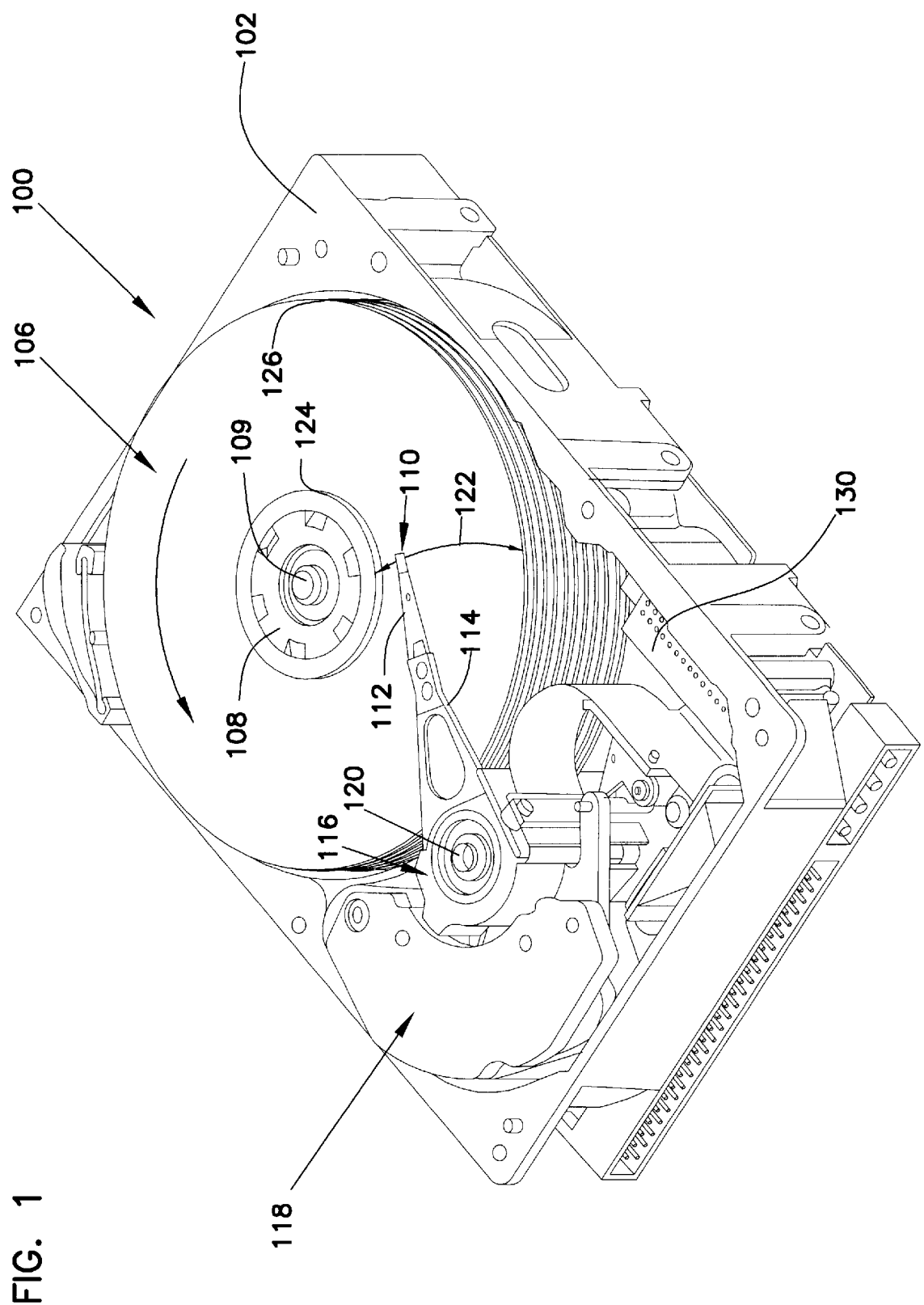
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. Actuator 116 is driven by a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
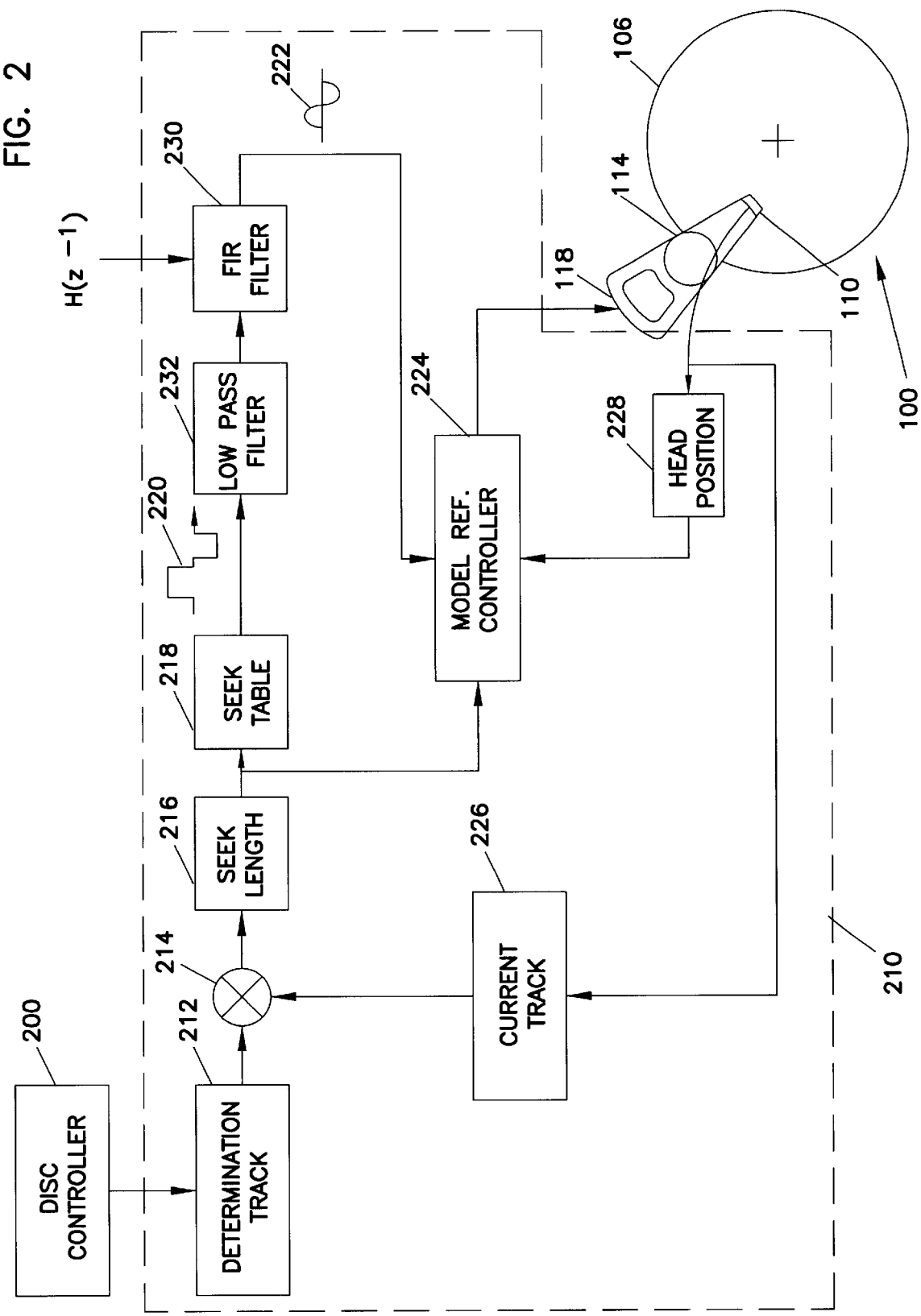
FIG. 2 is a block circuit diagram of a seek system according to the present invention which is employed in the servo electronics of the disc drive illustrated in FIG. 1.

FIG. 2 is a block diagram of a seek system employing the techniques of the present invention. Disc controller 200 provides seek commands to seek servo controller 210. The commands include identification of a destination track and segment. The identification of the destination track to which head 110 will be moved during the seek operation is received and stored in destination track register 212. Register 212 provides an output identifying the destination track to the summing input of summer 214. Summer 214 also receives the identification of the current track confronting head 110 from current track register 226. Summer 214 subtracts the destination track number from the current track number and provides information to seek length register 216 identifying the number of tracks to be crossed during the seek. The seek length information is stored in register 216 and provided to seek table 218 and to model reference controller 224. Table 218 is a look-up table providing bang-bang signals 220 through optional low pass filter 232 to finite impulse response filter 230. The bang-bang signals are pairs of positive and negative pulses, the duration of which is based on the length of the seek and the expected velocity of movement of head 110 and arm 114. Typically, the initial (positive) pulse accelerates arm movement and the following pulse (negative) decelerates arm movement to halt movement at the destination track.

Filter 230 provides a drive signal 222 to model reference controller 224 which in turn provides drive signals to voice coil motor 118 to move actuator arm 114 about its axis, thereby radially moving head 110 across the tracks on disc 106. Head 110 detects tracks crossed and supplies data to current track identifier 226 and to head position detector 228. Model reference controller 224 contains tables modeling the seek and track following operations of disc drive 100 for various seek and track following conditions. Controller 224 responds to signal 222 to operate voice coil motor 118 based on the seek length from register 216. As head 110 crosses tracks during the seek operation, controller 224 compares the seek length to the track crossing data from detector 228 and continues to model the disc drive to provide optimal voice coil motor drive signals to motor 118 until the destination track is reached. It will be appreciated by those skilled in the art that after the destination track is reached, head position detector continues to supply data to controller 224 for track following and centering purposes.

The present invention is directed to a filter, such as a finite impulse response filter 230, operable to receive the bang-bang signals from table 218 to dampen amplitudes of dominant vibration mode frequencies of bang-bang signal 220 and provide a smooth signal 222. Filter 230 has a discrete transfer function based on the mechanical characteristics of the system input at $H(z^{-1})$.

In an ideal disc drive system having no flexible modes, bang-bang signal 220 would be the time-optimal solution for track seeking, and vibration would be non-existent. However, disc drives have numerous flexible modes, the flexible suspension 112 (FIG. 1) that supports head 110 at the distal end of actuator arm 114 being one example. A bang-bang signal, therefore, is capable of generating positional and seek errors due to the presence of resonant modes. The present invention is directed to a filter that approximates the bang-bang command without exciting residual vibration. The filter is causal, has unity gain and a length as short as practical for minimum time lag of system response.

In the preferred embodiment of the present invention, filter 230 is a finite impulse response (FIR) filter, having a discrete transfer function based on the vibro-acoustical structure of the disc drive to eliminate, or at least dampen dominant unwanted vibration modes. The transfer function is derived from the frequencies and damping ratios corresponding to the unwanted vibration modes. Particularly, the i-th mode of the system is defined by the complex conjugate pair of poles in the s-domain $$s_i = -\zeta_i \omega_{ni} + j\omega_{ni}\sqrt{1-\zeta_i^2} \quad \text{and} \tag{1}$$
$$s_i^* = -\zeta_i \omega_{ni} - j\omega_{ni}\sqrt{1-\zeta_i^2}$$

where $\omega_{ni}$ and $\zeta_i$ are the natural frequency and damping ratio of the i-th mode. For digital implementation of the filter, the pair of poles is converted to discrete domain with the discrete sampling period T. The sampling period T of the filter is selected as a common multiple of system's sampling period $t_s$ in order to incorporate the filter into the servomechanism. Hence, the relationship between T and $t_s$ can be represented as $$T = l \cdot t_s \tag{2}$$

where l is a positive integer. The discrete pole locations of i-th vibration mode at sampling period $T=l \cdot t_s$ can be described as $$p_{li} = e^{s_i T} \text{ and } p_{li}^* = e^{s_i^* T} \tag{3}$$

Therefore, a causal filter $H_{li}(z^{-1})$ that is capable of canceling the poles at the i-th mode with the sampling period $T=l \cdot t_s$ takes the preliminary form $$H_{li}(z^{-1}) = (1 - p_{li}z^{-1})(1 - p_{li}^*z^{-1}) \tag{4}$$

Furthermore, for a system with m unwanted vibration modes, the filter $H_l(z^{-1})$, which is designed at the sampling period, $T=l \cdot t_s$ contains at least 2 m zeros to cancel all poles. This can be derived by cascading $H_{li}(z^{-1})$ for i=1,2,K,m. One form for filter $H_l(z^{-1})$ is $$H_l(z^{-1}) = C(1-p_{l1}z^{-1})(1-p_{l1}^*z^{-1})(1-p_{l2}z^{-1})(1-p_{l2}^*z^{-1}) K(1-p_{lm}z^{-1}) (1-p_{lm}^*z^{-1}) \tag{5}$$

where C is a constant to normalize the impulse amplitudes of $H_l(z^{-1})$.

Different sampling periods T can be considered by increasing the integer multiple l. Any change of sampling period will also change the amplitudes of impulse sequence of the filter by moving the discrete poles to different locations.

For those systems that require increased robustness for system uncertainty, multiple zeros may be placed at system poles. For a specific system with known system uncertainty, placement of multiple zeros at the same location will ensure acceptable robustness. Hence, the general form of $H_l(z^{-1})$ can be expressed as $$H_l(z^{-1}) = C(1-p_{l1}z^{-1})^{k_l}(1-p_{l1}^*z^{-1})^{k_l}K(1-p_{lm}z^{-1})^{k_m}(1-p_{lm}^*z^{-1})^{k_m} \tag{6}$$

where $k_i$ through $k_m$ represent the order of robustness at each unwanted vibration mode. It will be appreciated to those skilled in the art that greater robustness due to system uncertainty increases filter length, which introduces time lag into actuator command current. Thus, increasing robustness decreases system performance.

It is important that the output of the filter not exceed the actuator capacity. In most cases, requiring all impulse amplitudes of the filter to be positive satisfies this constraint. Consequently, when the impulse sequence is convolved with an arbitrary command, the resulting filtered command will not exceed the maximum magnitude of the original command. For certain command profiles, negative impulses can reduce the time-length of the filter without violating the actuator limit.

For the optimal solution, the filter $H_l(z^{-1})$ may be represented by an impulse sequence $$H_l(z^{-1}) = C(1 + a_{l1}z^{-1} + a_{l2}z^{-2} + \Lambda + a_{lr}z^{-r}) \tag{7}$$

where $a_{l1}$ through $a_{lr}$ are the amplitudes resulting from polynomial expansion of equation (6) and $$r = 2(k_1 + k_2 + \Lambda + k_m) \tag{8}$$

The candidate filters can be generated and expanded to the polynomial expressions by increasing l. The all-positive amplitude solution with shortest sampling period T will be the optimal filter. The reason for selecting the filter with smallest l is to ensure the filter has minimum time duration.

The constant C is derived by meeting the unity gain constraint.

From the final value theorem, the unit step response of $H_l(z^{-1})$ will be $$\lim_{z \to 1} H_l(z^{-1}) = 1 \tag{9}$$

From the polynomial expansion of $H_l(z^{-1})$ in equation (7), equation (9) can also be expressed as $$C(1 + a_{l1} + a_{l2} + \Lambda + a_{lr}) = 1 \tag{10}$$

The constant C is thus $$C(1 + a_{l1} + a_{l2} + \Lambda + a_{lr})^{-1} \tag{11}$$

The filter $H_l(z^{-1})$ is re-sampled at the sampling period $t_s$ for servomechanism incorporation. The re-sampling procedure can be accomplished by replacing $z^{-1}$ with $z^{-1}$ in $H_l(z^{-1})$. The final solution of time-optimal filter $H(z^{-1})$ for suppressing m unwanted vibration modes at the sampling period $t_s$ is expressed as $$H(z^{-1}) = C(1 + a_{l1}z^{-1} + a_{l2}z^{-l \cdot 2} + \Lambda + a_{lr}z^{-l \cdot r}) \tag{12}$$

By using the discrete z-plane to derive the solution, the result is the impulses of the filter are always spaced at multiples of $(l \cdot t_s)$. In the case where l is small, the corresponding impulse sequence is close to optimally short. However, when a large l is required to meet the actuator constraints, the resulting sequence may not be optimally short. For example, in a system with two widely spaced modes of vibration, a two-mode filter derived using zero-placement is typically longer than a filter derived by convolving two single-mode filters. Therefore, where multi-mode filters may not produce shortest filter length, a filter derived from the convolution of a single-mode filter can be substituted for acceptable filter time-length.

EXAMPLE

Acoustic measurements were conducted on a BARRACUDA® 18LP disc drive, available from Seagate Technology, Inc. of Scotts Valley, Calif. to determine the vibro-acoustical structure of the drive. The disc drive servo has a sampling period of 26.4 μsec. As a result of the acoustic measurements, five dominant vibration modes were detected at about 1,600 Hz, 3,200 Hz, 5,400 Hz, 7,300 Hz, and 9,000 Hz respectively. The corresponding damping ratios were estimated as 0.05 for all modes. From equation (1), the pole locations in the s-domain were calculated as $$s_1, s_1^* = -565 \pm j11296$$

$$s_2, s_2^* = -1131 \pm j22591$$

$$s_3, s_3^* = -1696 \pm j33887$$

$$s_4, s_4^* = -2293 \pm j45810$$

$$s_5, s_5^* = -2827 \pm j56478 \tag{13}$$

Integer l was set equal to 2 for an all-positive amplitude solution with shortest time duration. The final discrete transfer function $H(z^{-1})$ of FIR filter 230 for suppressing the five unwanted vibration modes is thus expressed as $$H(z^{-1}) = 0.104 + 0.118z^{-2} + 0.093z^{-4} - 0.101z^{-6} + 0.095z^{-8} + 0.094z^{-10} + 0.093z^{-12} + 0.092z^{-14} + 0.086z^{-16} + 0.084z^{-18} + 0.042z^{-20} \tag{14}$$

Figure 3:
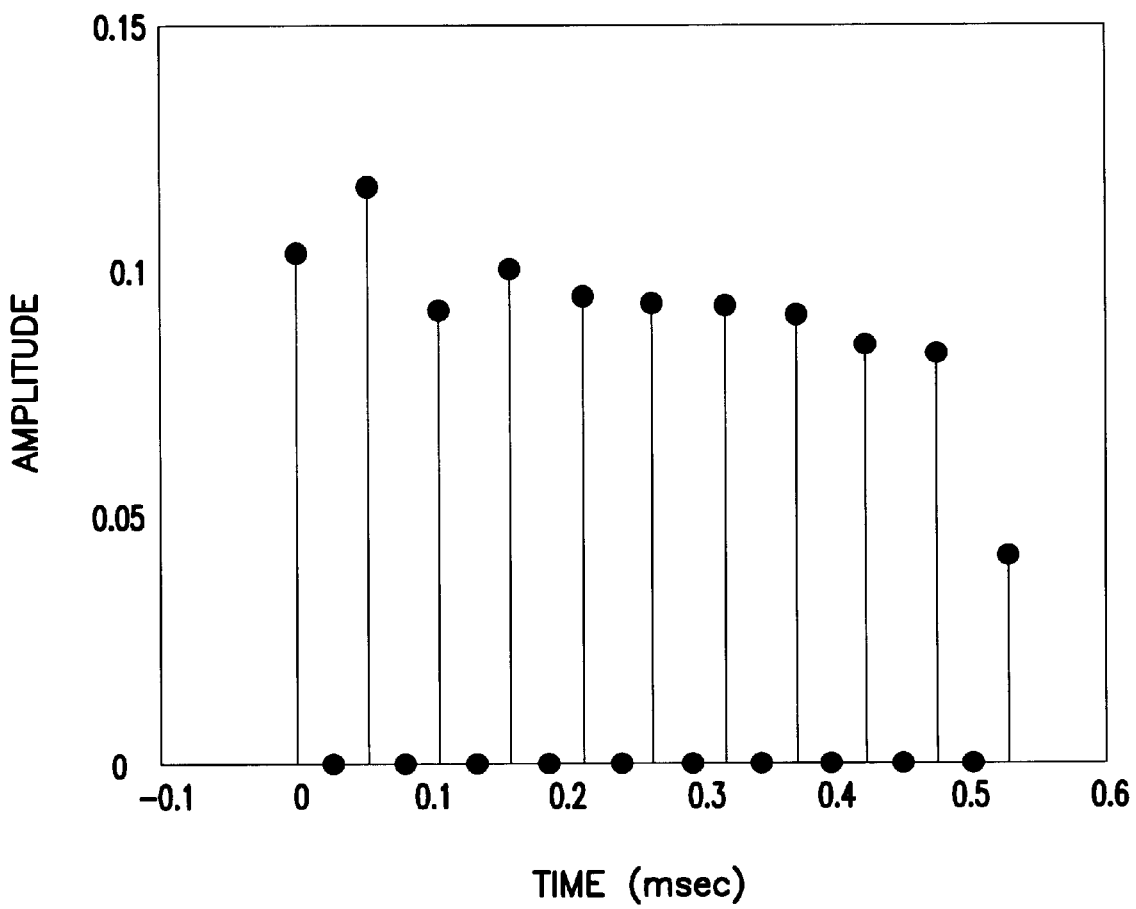
FIG. 3 is a graph illustrating one example of an impulse sequence of a filter used in the seek system of the present invention.

FIR filter 230 was constructed to exhibit the discrete transfer function described in equation (14). FIG. 3 illustrates the impulse sequence of filter 230 in time domain. As shown in FIG. 3, filter 230 exhibits 21 taps with a total time duration of 0.554 msec. The performance of the disc drive under test was evaluated using 50-track seek operations, and both conventional position-velocity seek operations using bang-bang commands and filtered bang-bang commands using the FIR filter with the above described discrete transfer function.

Figure 4:
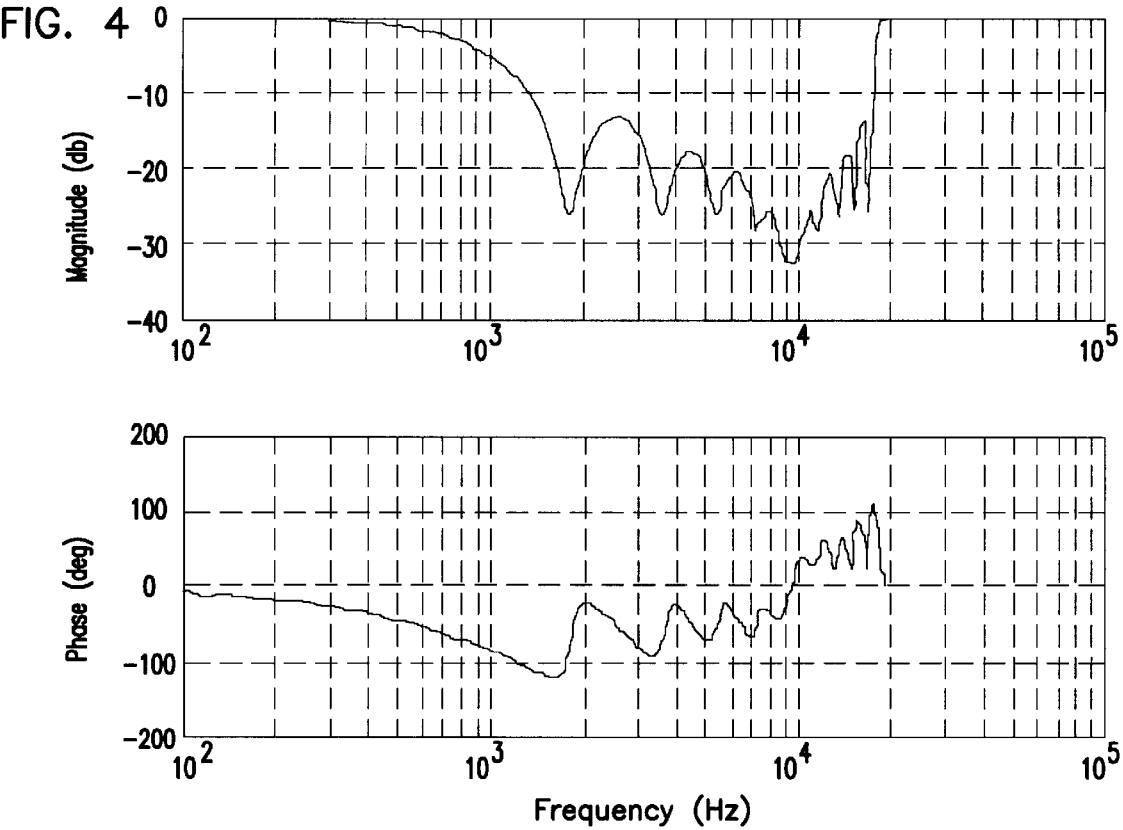
FIGS. 4 and 5 are waveforms on the phase and amplitude of a seek signal across the frequency range for the example illustrated in FIG. 3.

FIG. 4 illustrates the frequency response of filter 230 up to the Nyquist frequency. The magnitude over the entire frequency range is not greater than one. Notches can be observed in the frequency plot at the frequencies of the five dominant vibration modes: 1600 Hz, 3200 Hz, 5400 Hz, 7300 Hz, and 9000 Hz. Hence, filter 230 attenuates the unwanted frequency components effectively without exciting any other frequency.

Figure 5:
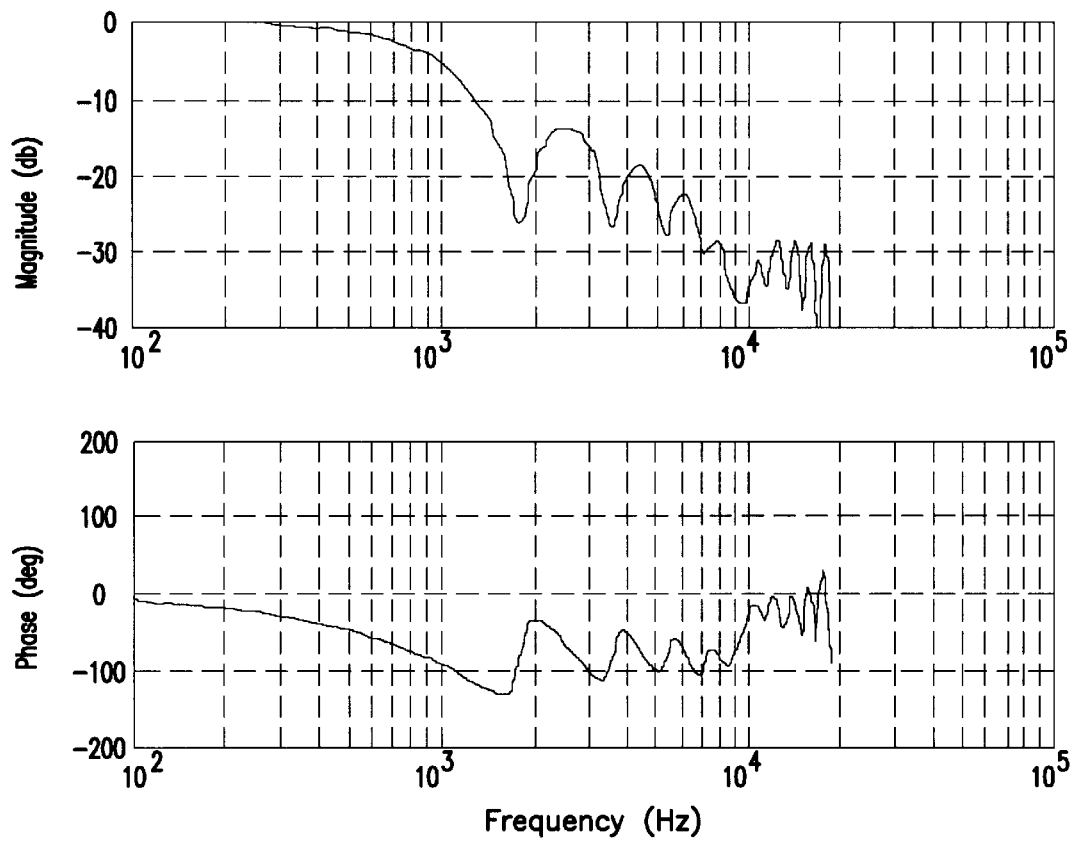

However, there is minimal attenuation at the very high frequency range close to the Nyquist frequency. To address these high frequency components, a first order Butterworth low-pass filter 232 may be used between table 218 and FIR filter 230. Filter 232 may, for example, exhibit a cutoff frequency of 8000 Hz, thereby attenuating signal frequencies above about 8000 Hz before application to FIR filter 230. FIG. 5 illustrates the frequency response of the combined filters 230 and 232. A comparison of the frequency plots of FIGS. 4 and 5 reveals the attenuation above 8000 Hz.

Figure 6:
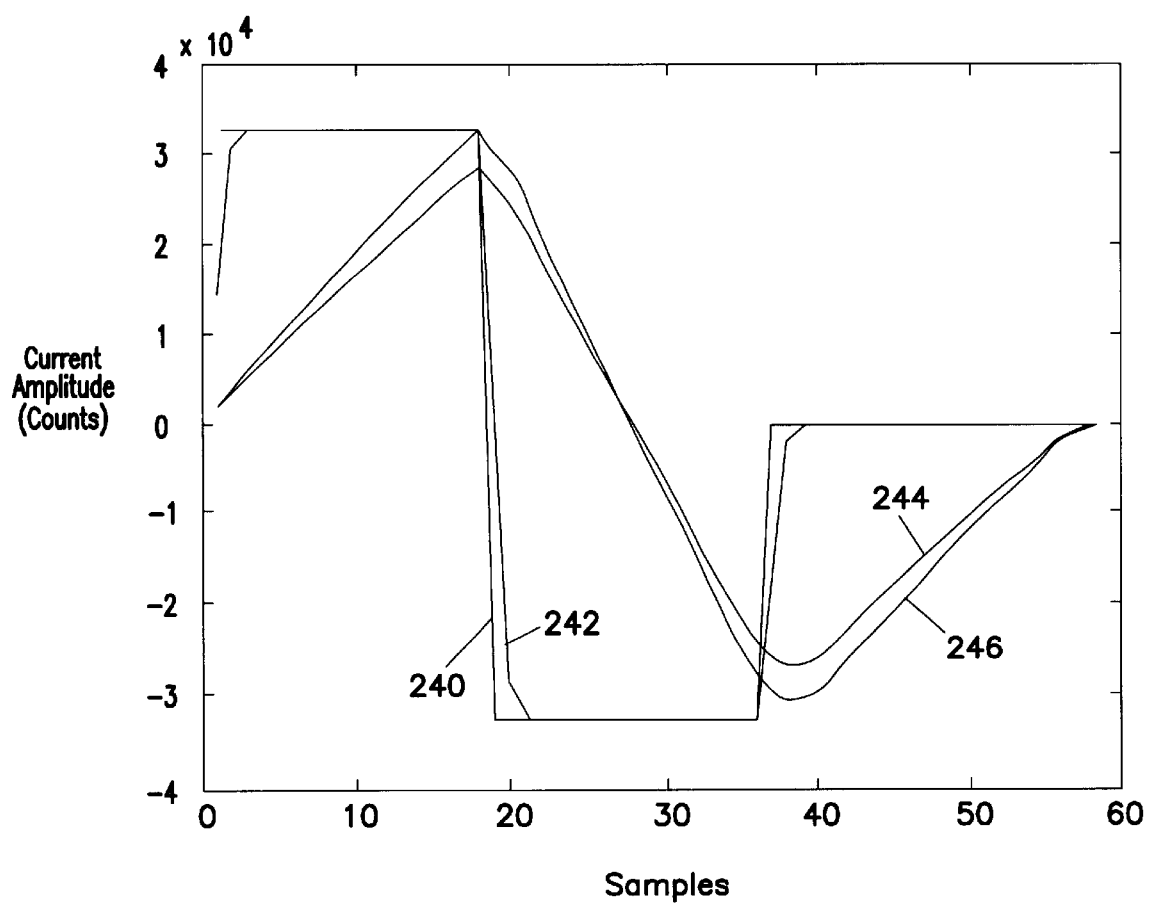
FIG. 6 is a waveform illustrating transition of the seek signal from the servo controller through the filter of the present invention.

Tests were conducted on the disc drive with an original input bang-bang command from seek table 218 having a maximum current amplitude count of 32,767. The bang-bang command was filtered by low-pass filter 232 and FIR filter 230 having the above-described discrete transfer function. The output from FIR filter 230 was scaled with the same maximum current amplitude count and applied as the 50-track seek profile to voice coil motor 118. FIG. 6 illustrates the waveform transitions from the bang-bang command to final seek profile. More particularly, waveform 240 represents the bang-bang command issued by seek table 218 (FIG. 2), waveform 242 represents the low-pass filtered command from filter 232, waveform 244 represents the FIR filtered signal from filter 230, and waveform 246 represents the scaled and filtered signal to voice coil motor 118.

Figure 7:
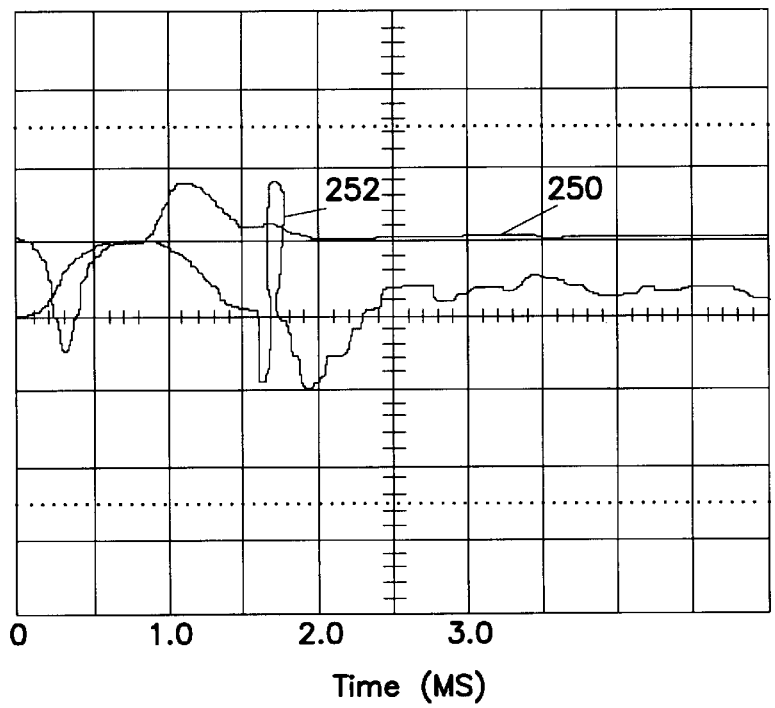
FIGS. 7 and 8 are waveforms comparing the seek signal without filtering to seek signals with filtering according to the present invention.

The experimental results showed that the average 50-track seek and settle time was 2.45 msec using the prior PV seek method. Audible acoustic noise was detected during seeking. FIG. 7 shows the 50-track seek using the prior PV seek method measured from an oscilloscope. Waveform 250 is the seeking current and waveform 252 represents the estimated velocity of radial movement of the head during both track seeking and the subsequent tracking settling and following. The plot shows that the track seeking was completed at about 1.6 msec and 0.85 msec track settling time was required to damp out the residual vibration and switch to the track following mode.

Figure 8:
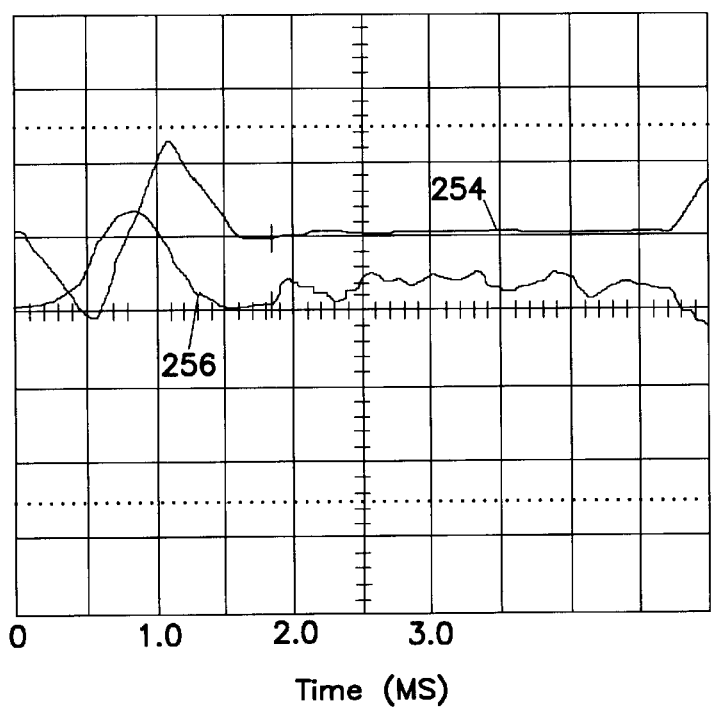

FIG. 8 is the corresponding 50-track seek signal plot by using filtered profile employing the teachings of the present invention. The average 50-track seek and settle time using filtered seeking command profile was 1.84 msec (compared to 2.54 msec using the prior PV method), and the acoustic noise was barely audible. Waveform 254 is the seeking current and waveform 256 represents the estimated velocity of radial movement of the head both during both track seeking and the subsequent tracking settling and following. As shown in FIG. 8, track seeking was completed at 1.53 msec and only 0.31 msec track settling time was required. Comparison of FIGS. 7 and 8 reveals that while the present invention marginally improves track seeking (1.53 msec, compared to 1.6 msec of the prior PV method), a dramatic improvement in track settling is achieved by the present invention (0.31 msec, compared to 0.85 msec of the prior PV method).

The apparatus of the present invention suppresses seek-induced vibration in disc drive 100. Disc drive 100 includes disc 106 containing a plurality of concentric data tracks and movable arm 114 carrying transducing head 110. Actuator 118 is operable in response to bang-bang commands from controller 210 to move arm 114 to position head 110 adjacent a selected track on the disc so that the head selectively reads data from or writes data to the selected track on the disc. Controller 210 provides bang-bang commands for operating actuator 118. Filter 230 is responsive to each selected bang-bang command to provide an operating signal to the actuator. Each operating signal has damped amplitudes of dominant vibration mode frequencies of the selected bang-bang command. In a preferred form of the invention, the filter is a finite impulse response filter. Low pass filter 232 may be optionally included to remove frequencies in the bang-bang command above a designated frequency.

The invention also provides a method of suppressing seek-induced vibration in a disc drive 100. The disc drive contains one or more discs 106, each having a plurality of concentric data tracks, and a movable arm 114 carrying a transducing head 110. Actuator 118 coupled to the arm moves the arm to radially move the head relative to the disc. Controller 130, 210 provides operating signals to actuator 118 to position the head adjacent a destination track selected by a seek command. The controller includes look-up table 218 containing representations of a plurality of bang-bang commands representing position-velocity profiles. Seek induced vibration in disc drive 100 is suppressed by deriving a discrete transfer function for a finite impulse response filter 230 of $$C(1+a_{l1}z^{-1}+a_{l2}z^{-l\cdot 2}+\ldots+a_{lr}z^{-l\cdot r}),$$

where C is a constant, $a_{l1}$, $a_{l2}$, ... $a_{lr}$ represent impulse amplitudes at spaced positions within a sample period and $z^{-l\cdot 1}$, $z^{-l\cdot 2}$, ... $z^{-l\cdot r}$ represent delay components at the respective spaced positions. The bang-bang command is filtered using the finite impulse response filter 230 to derive the operating signals to the actuator 118. Preferably finite impulse filter 230 employs a pole-zero cancellation technique to damp amplitudes of selected frequencies. Derivation of the discrete transfer function is based on a conjugate pair of poles in the s-domain for each of a plurality of vibration frequencies of $$s_i = -\zeta_i \omega_{ni} + j\omega_{ni}\sqrt{1-\zeta_i^2} \quad \text{and}$$

$$s_i^* = -\zeta_i \omega_{ni} - j\omega_{ni}\sqrt{1-\zeta_i^2}$$

where $\zeta_i$ is the damping ratio and $\omega_{ni}$ is the natural frequency for the i-th mode.

The present invention provides a track seeking strategy using zero placement technique for suppressing seek-induced vibration. The filter demonstrates better acoustic and track settling properties and can be merged into the seek controller or can be included in the off-line seeking command profile generator. The design procedure is straightforward without skilled tuning.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of arts within the principles of the present invention to the full extent indicated by the broad general meaning of the terms in which the appended claims are expressed. For example, the particular elements may vary depending on the particular application for the filter while maintaining substantially the same functionality without departing from the scope and spirit of the present invention. In addition, although the preferred embodiment described herein is directed to a finite impulse response filter for a magnetic disc drive system, it will be appreciated by those skilled in the art that the teachings of the present invention can be applied to other systems, like optical disc drive systems, and tape systems employing parallel tracks served by a single head. In any of these systems, low pass or band pass filtering provided by filter 232 may be performed sequentially before or after the FIR filter, or can be eliminated altogether, depending on the particular application. Other modifications can also be made without departing from the scope and spirit of the present invention.

What is claimed is:

1. Apparatus for suppressing seek-induced vibration in a disc drive having an actuator responsive to bang-bang commands to perform seek operations to move a head to selected tracks on a disc, the apparatus comprising:

a controller for providing a series of bang-bang commands for operating the actuator; and a filter constructed to dampen signal amplitudes having frequencies associated with dominate vibration modes of the disc drive, the filter being responsive to selected ones of the bang-bang commands to provide, for each selected bang-bang command, an operating signal to the actuator representing the selected bang-bang command having damped amplitudes at the dominant vibration mode frequencies.

2. The apparatus of claim 1, further comprising a second filter connected between the controller and the actuator, the second filter being arranged to remove representations of frequencies in the selected bang-bang command above a designated frequency.

3. The apparatus of claim 1, wherein the filter is a finite impulse response filter.

4. The apparatus of claim 3, further comprising a second filter connected between the controller and the finite impulse response filter, the second filter being arranged to remove representations of frequencies in the selected bang-bang command above a designated frequency.

5. The apparatus of claim 3, wherein the finite impulse response filter has a discrete transfer function of $$C(1+a_{l1}z^{-1}+a_{l2}z^{-l \cdot 2}+ \ldots +a_{lr}z^{-l \cdot r}),$$

where C is a constant, $a_{l1}, a_{l2}, \ldots a_{lr}$ represent impulse amplitudes at spaced positions within a sample period and $z^{-l \cdot 1}, z^{-l \cdot 2}, \ldots z^{-l \cdot r}$ represent delay components at the respective spaced positions.

6. The apparatus of claim 5, wherein the finite impulse response filter has a discrete sampling period, T, that is an integer multiple, l, of the controller sampling period, $t_s$.

7. A method of suppressing seek-induced vibration in a disc drive, comprising steps of:

(a) providing a finite impulse response filter having a discrete transfer function of $$C(1+a_{l1}z^{-1}+a_{l2}z^{-l \cdot 2}+ \ldots +a_{lr}z^{-l \cdot r}),$$

where C is a constant, $a_{l1}, a_{l2}, \ldots a_{lr}$ represent impulse amplitudes at spaced positions within a sample period and $z^{-l \cdot 1}, z^{-l \cdot 2}, \ldots z^{-l \cdot r}$ represent delay components at the respective spaced positions;

(b) providing a bang-bang command for performing a seek operation;

(c) filtering the bang-bang command using the finite impulse response filter to derive an operating signal; and (d) positioning a head relative to a disc in the disc drive based on the operating signals.

8. The method of claim 7, wherein the finite impulse response filter damps amplitudes of selected frequencies by pole-zero cancellation, and step (a) is based on a conjugate pair of poles in an s-domain for each of a plurality of vibration frequencies of $$s_i = -\zeta_i \omega_{ni} + j\omega_{ni}\sqrt{1-\zeta_i^2} \quad \text{and}$$

$$s_i^* = -\zeta_i \omega_{ni} - j\omega_{ni}\sqrt{1-\zeta_i^2}$$

where $\zeta_i$ is the damping ratio and $\omega_{ni}$ is the natural frequency for the i-th mode.

9. The method of claim 8, further comprising a step of (e) removing representations of frequencies in the bang-bang command above a designated frequency.

10. The method of claim 9, wherein step (e) is performed after step (b) and before step (c).

11. The method of claim 9, wherein the finite impulse response filter has a discrete sampling period, T, that is an integer multiple, l, of a controller sampling period, $t_s$.

12. The method of claim 8, wherein the finite impulse response filter has a discrete sampling period, T, that is an integer multiple, l, of a controller sampling period, $t_s$.

13. The method of claim 7, further comprising a step of (e) removing representations of frequencies in the bang-bang command above a designated frequency.

14. The method of claim 13, wherein step (e) is performed after step (b) and before step (c).

15. The method of claim 13, wherein the finite impulse response filter has a discrete sampling period, T, that is an integer multiple, l, of a controller sampling period, $t_s$.

16. The method of claim 7, further comprising a step of (e) removing representations of frequencies in the bang-bang command above a designated frequency.

17. The method of claim 16, wherein step (e) is performed after step (b) before step (c).

18. The method of claim 7, wherein the finite impulse response filter has a discrete sampling period, T, that is an integer multiple, l, of a controller sampling period, $t_s$.

* * * * *

UNITED STATES PATENT AND TRADEMARK OFFICE
CERTIFICATE OF CORRECTION

PATENT NO. : 6,560,059 B1  
DATED : May 6, 2003  
INVENTOR(S) : Hsin et al.

It is certified that error appears in the above-identified patent and that said Letters Patent is hereby corrected as shown below:

Column 10,  
Line 9, delete "$C(1 + a_{11}z^{-1} + a_{12}z^{-12} + \ldots + a_{1r}z^{-1.r})$," and insert -- $C(1 + a_{11}z^{-1} + a_{12}z^{-1.2} + \ldots A_{1r}z^{-1.r})$, --.

Lines 41, 44, 52 and 60, delete "1" and insert -- 1 --.

Signed and Sealed this

Twenty-fifth Day of January, 2005

JON W. DUDAS  
*Director of the United States Patent and Trademark Office*